United States Patent
Farmayan et al.

(10) Patent No.: US 8,007,681 B2
(45) Date of Patent: Aug. 30, 2011

(54) METHODS, COMPOSITIONS, AND BURNER SYSTEMS FOR REDUCING EMISSIONS OF CARBON DIOXIDE GAS INTO THE ATMOSPHERE

(75) Inventors: Walter Farman Farmayan, Houston, TX (US); Abud Saeed Jamaluddin, Sugar Land, TX (US); Mahendra L Joshi, Katy, TX (US); Scott Lee Wellington, Bellaire, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/109,938

(22) Filed: Apr. 25, 2008

(65) Prior Publication Data

US 2010/0252776 A1  Oct. 7, 2010

(51) Int. Cl.
*A62D 3/38* (2007.01)
*F01N 3/08* (2006.01)

(52) U.S. Cl. ........... 252/186.24; 252/186.1; 422/173; 431/4; 431/5; 431/9; 431/10

(58) Field of Classification Search ........... 252/186.1, 252/186.24; 422/173; 431/4, 5, 9, 10
See application file for complete search history.

(56) References Cited

U.S. PATENT DOCUMENTS

| | | | |
|---|---|---|---|
| 4,060,379 A | 11/1977 | LaHaye et al. | 432/179 |
| 5,468,458 A | 11/1995 | Watson | 423/222 |
| 6,077,072 A * | 6/2000 | Marin et al. | 432/105 |
| 6,752,620 B2 * | 6/2004 | Heier et al. | 431/8 |
| 6,773,256 B2 * | 8/2004 | Joshi et al. | 431/9 |
| 7,073,348 B2 | 7/2006 | Clodic et al. | |
| 7,172,030 B2 | 2/2007 | Horner et al. | |
| 7,282,189 B2 | 10/2007 | Zauderer | |
| 2006/0201405 A1 | 9/2006 | Devault et al. | 10/266 |
| 2006/0234172 A1 | 10/2006 | Melton et al. | 431/5 |
| 2009/0255450 A1 | 10/2009 | Stone et al. | 110/345 |
| 2010/0081098 A1 | 4/2010 | D'Agostini et al. | 431/5 |
| 2010/0104482 A1 | 4/2010 | Morin et al. | 422/142 |

OTHER PUBLICATIONS

U.S. Appl. No. 60/925,685 entitled "Systems and Processes for Use In Situ Heat Treatment Processes," filed Apr. 20, 2007 (pending).

* cited by examiner

*Primary Examiner* — Douglas McGinty
(74) *Attorney, Agent, or Firm* — Charles W. Stewart

(57) ABSTRACT

A method of preparing an oxidant stream comprising: burning a combustion mixture comprising (a) one or more fuel composition and (b) oxidant comprising a first oxygen content of about 10 mole % or more and a first carbon dioxide ($CO_2$) gas content of about 68 mole % or more on a dry basis, the burning producing a flue gas comprising $CO_2$ gas, water vapor, and unreacted oxygen; separating from the flue gas a recycle stream; mixing at least a portion of the recycle stream having a first pressure with a sufficient amount of an oxygen stream having a second pressure which is sufficiently higher than the first pressure to entrain at least a portion of the recycle stream in the oxidant stream and to produce the oxidant stream having a second oxygen content of 10 mole % or more and a second $CO_2$ gas content of about 68 mole % or more on a dry basis.

29 Claims, 7 Drawing Sheets

US 8,007,681 B2

METHODS, COMPOSITIONS, AND BURNER SYSTEMS FOR REDUCING EMISSIONS OF CARBON DIOXIDE GAS INTO THE ATMOSPHERE

CROSS REFERENCE TO RELATED APPLICATIONS

The present application relates to the following pending applications: U.S. Provisional Application Ser. No. 60/925,685 entitled "Systems an Processes for Use In Situ Heat Treatment Processes," filed Apr. 20, 2007 (pending), assigned to Shell Oil Company.

FIELD OF THE INVENTION

The present application provides methods, compositions, and burner systems for reducing emissions of carbon dioxide ($CO_2$) gas into the atmosphere.

BACKGROUND OF THE INVENTION

Recently, there has been increased awareness of the potential impact that greenhouse gases have on the environment. This increased awareness has resulted in the development of new technologies to lower emissions and/or to capture or store the $CO_2$ found in such emissions.

Refinery process furnaces using air as an oxidant typically produce 8 to 10 moles of nitrogen for every mole of methane consumed.

Current technologies for separating $CO_2$ from nitrogen in flue gas include amine absorber towers and/or membrane separation units. Unfortunately, it is not very cost-effective to separate carbon dioxide from flue gas using these technologies. The flow streams in the separation units have to be cooled, dried, and the pressure of the flow streams has to be raised significantly in order to achieve reasonable carbon dioxide removal efficiency. If such a separation is possible, the separation is costly and can be labor and/or equipment intensive.

Some have considered replacing air with pure oxygen as the oxidant when operating such furnaces. Pure oxygen generally is free of nitrogen and thus provides nitrogen free combustion.

Unfortunately, the cost of supplying and/or transporting pure oxygen to process heaters is relatively high. For example, pure oxygen may be supplied by Air Separation Units (ASU), Vacuum Swing Adsorption (VSA) units, nitrogen separating polymeric membranes, and/or as cryogenic liquid oxygen transported by trucks. The cost of supplying pure oxygen to the process would depend, for example, on the quantity of oxygen required, the purity of oxygen required, and the production and transportation costs for the pure oxygen.

Pure oxygen also lacks diluents, such as nitrogen, to reduce flame temperatures. As a result, combustion of a fuel comprising pure oxygen as the oxidant produces a flame that is very hot and very intense. The adiabatic flame temperature of a natural gas/pure oxygen flame may reach about 5000° F. Such temperatures far exceed the process heating temperatures of about 2000° F. generally used in refinery processes. Further, greater than 2000° F. process temperatures reduce the life of process tubes due to high temperature oxidation and reduction in creep strength of most metals. Because of the high flame temperature of oxy-fuel combustion and the need for using high temperature exotic alloys for process tube construction, the process industry has been skeptical of using pure oxygen as an oxidant in refinery process furnaces.

Efficient methods and oxidants are needed to reduce greenhouse gas emissions while maintaining a safe flame temperature during the operation of furnaces and burners.

BRIEF SUMMARY

The present application provides a method of reducing greenhouse gas emissions while maintaining safe flame temperatures during the operation of furnaces and burners.

In one embodiment, the application provides a method of controlling the temperature of a flame produced by a burner.

In one embodiment, the application provides a method of controlling emissivity and heat transfer properties of the flame.

In one embodiment, the application provides a method of preparing an oxidant stream comprising: burning a combustion mixture comprising (a) one or more fuel composition and (b) oxidant comprising a first oxygen content of about 10 mole % or more and a first carbon dioxide ($CO_2$) gas content of about 68 mole % or more on a dry basis, the burning producing a flue gas comprising $CO_2$ gas, water vapor, and unreacted oxygen; recovering a recycle stream from the flue gas; mixing at least a portion of the recycle stream at a first pressure with a sufficient amount of an oxygen stream at a second pressure which is sufficiently higher than the first pressure to entrain at least a portion of the recycle stream in the oxidant stream and to produce the oxidant stream having a second oxygen content of 10 mole % or more and a second $CO_2$ gas content of about 68 mole % or more on a dry basis.

In one embodiment, the application provides a method of controlling the temperature of a flame produced by a furnace, the method comprising: burning a combustion mixture over a process section length, the combustion mixture comprising (a) one or more fuel composition and (b) an oxidant stream comprising an oxygen content of about 10 mole % or more and an $CO_2$ gas content of about 68 mole % or more, the burning producing a flame having a flame temperature and flue gas comprising $CO_2$ gas; controlling the flame temperature over flame length by varying the oxygen content and the $CO_2$ gas content of the oxidant stream.

In another embodiment, the application provides a method of controlling emissivity and heat transfer properties of a furnace, the method comprising: burning a combustion mixture comprising one or more fuel composition and oxidant comprising an oxygen content of 10 mole % or more and an $CO_2$ gas content of 68 mole % or more, the burning producing flue gas comprising $CO_2$ gas; controlling emissivity and heat transfer properties of the furnace by varying the oxygen content and the $CO_2$ gas content of the oxidant.

In another embodiment, the application provides a burner system adapted to capture and recycle $CO_2$ gas in a flue gas, the burner system comprising: a burner in fluid communication with a fuel inlet and a convection outlet; an apparatus in fluid communication with the convection outlet, a recycle conduit, and a $CO_2$ storage system, the apparatus being selected from the group consisting of a stack and a manifold; an oxygen mixing conduit in fluid communication with the recycle conduit, the fuel inlet, an oxidant inlet.

In another embodiment, the application provides a burner system adapted to capture and recycle $CO_2$ gas from flue gas, the burner system comprising: a burner in fluid communication with a fuel inlet, an oxygen mixing conduit, and a convection area in fluid communication with a stack adapted to store $CO_2$ gas, the stack comprising a stack damper adapted to control a flow of flue gas into the stack, the oxygen mixing conduit being in fluid communication with an oxygen inlet and the burner and having an oxygen mixing damper adapted to control a flow of oxidant to the burner; and, a recycle conduit in fluid communication with the stack, a blower, a water removal apparatus, and the oxygen mixing conduit, the recycle conduit comprising a recycle damper adjacent to the stack adapted to control a flow of flue gas into the CO2 gas recycle conduit.

DETAILED DESCRIPTION

Figure 1:
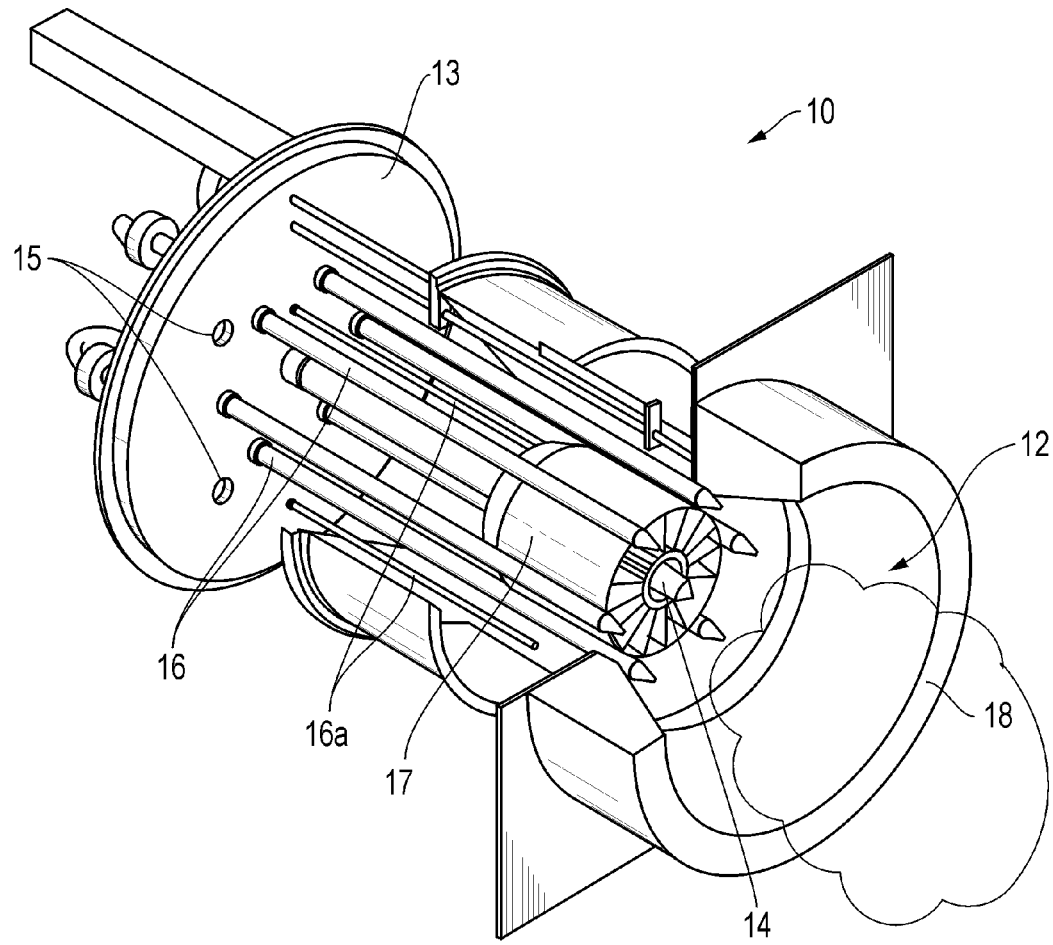
FIG. 1 is a schematic diagram of a typical raw gas burner.

The present application provides methods and compositions useful to reduce emission of nitrogen oxides ($NO_x$) and carbon dioxide ($CO_2$) into the atmosphere during the operation of a burner or a furnace. In one embodiment, the methods and compositions reduce emissions of $NO_x$ by 80 vol. % or more. In one embodiment, $NO_x$ emissions are reduced by 90 vol. % or more. In one embodiment, $NO_x$ emissions are reduced by more than 90 vol. %.

In one embodiment, the methods and compositions reduce such emissions and also provide for control over flame and/or operating temperatures of the furnace. In one embodiment, the methods and compositions also provide for control over the radiative heat flux characteristics of the furnace. In one embodiment, the methods provide for carbon dioxide capture at very little capital cost. In one embodiment, only minimal modifications to existing equipment for air-fuel combustion are required to practice the methods.

In one embodiment, the application provides a method of preparing an oxidant stream comprising controllably mixing an oxygen stream with a $CO_2$ gas recycle stream under conditions effective to produce the oxidant stream. In one embodiment, the method comprises mixing the recycle stream with a sufficient amount of an oxygen stream having a sufficient concentration of oxygen to produce an oxidant stream having an oxygen content of 10 mole % or more.

In one embodiment, the recycle stream comprises a sufficient amount of oxygen to produce an oxidant stream having an oxygen content of 14 mole % oxygen or more. In one embodiment, the recycle stream comprises a sufficient amount of oxygen to produce an oxidant stream having an oxygen content of 18 mole % oxygen or more. In one embodiment, the recycle stream comprises a sufficient amount of oxygen to produce an oxidant stream having an oxygen content of 21 mole % oxygen or more. In one embodiment, the recycle stream comprises a sufficient amount of oxygen to produce an oxidant stream having an oxygen content of 22 mole % oxygen or more. In one embodiment, the recycle stream comprises a sufficient amount of oxygen to produce an oxidant stream having an oxygen content of 24 mole % oxygen or more. In one embodiment, the recycle stream comprises a sufficient amount of oxygen to produce an oxidant stream having an oxygen content of 28 mole % oxygen or more.

In one embodiment, the recycle stream comprises a sufficient amount of oxygen to produce an oxidant stream having an oxygen content of about 32 mole % or less. In one embodiment, the recycle stream comprises a sufficient amount of oxygen to produce an oxidant stream having an oxygen content of about 30 mole % or less.

In one embodiment, the oxygen stream is injected into the recycle stream under pressure. In one embodiment, the oxygen stream is injected into the recycle stream under sufficient pressure to entrain at least a portion of the recycle stream in the oxygen stream, thereby producing the oxidant stream. In one embodiment, the oxygen stream is injected into the recycle stream under sufficient pressure to provide at least a portion of the motive force required to operate the burner system. In one embodiment, the oxygen stream is injected into the recycle stream under sufficient pressure to provide the entire motive force required to operate the burner system.

In one embodiment, the application provides a method comprising feeding the oxidant stream and one or more fuel composition to a burner. In one embodiment, the method comprises feeding the oxidant stream and one or more fuel composition through separate ducts to a burner. In one embodiment, the method comprises producing the flue gas using one burner, and recycling the oxidant stream to the same burner. In one embodiment, the $CO_2$ gas content of the oxidant stream is sufficient to makeup a majority of the volume typically provided by nitrogen in air. In one embodiment, the $CO_2$ gas content in the oxidant stream is sufficient to ensure a sufficient gas volume to maintain the temperature and heat flux profiles in the burner system.

In one embodiment, the oxidant stream comprises 60% or more $CO_2$ gas on a dry basis. In one embodiment, the oxidant stream comprises about 65% or more $CO_2$ gas on a dry basis. In one embodiment, the oxidant stream comprises about 70% or more $CO_2$ gas on a dry basis. In one embodiment, the oxidant stream comprises about 75% or more $CO_2$ gas on a dry basis. In one embodiment, the oxidant stream comprises about 80% or more $CO_2$ gas on a dry basis. In one embodiment, the oxidant stream comprises about 85% or more $CO_2$ gas on a dry basis. In one embodiment, the oxidant stream comprises about 90% or more $CO_2$ gas on a dry basis.

In one embodiment, the application provides a method comprising controlling the oxygen content and the $CO_2$ gas content of the oxidant to control one or more of a variety of parameters. Such parameters include, for example, heat flux, temperature of the flame, operating temperature of the furnace, emissivity properties of the furnace, heat transfer properties of the furnace, and combinations thereof. Generally, the foregoing parameters increase with the oxygen content in the oxidant stream. Generally, the foregoing parameters decrease with the oxygen content in the oxidant stream.

In one embodiment, the application provides the oxidant stream, itself. In one embodiment, the application provides an oxidant stream comprising an oxygen content of about 10 mole % or more and a $CO_2$ gas content. In one embodiment, the oxidant stream has an oxygen content of about 14 mole % or more. In one embodiment, the oxidant stream has an oxygen content of about 18 mole % or more. In one embodiment, the oxidant stream has an oxygen content of about 21 mole % or more. In one embodiment, the oxidant stream has an oxygen content of about 22 mole % or more. In one embodiment, the oxidant stream has an oxygen content of about 24 mole % or more. In one embodiment, the oxidant stream has an oxygen content of about 28 mole % or more.

In one embodiment, the oxidant stream has an oxygen content of about 32 mole % or less. In one embodiment, the oxidant stream has an oxygen content of about 30 mole % or less.

In one embodiment, the application provides an oxidant stream having an oxygen content of from about 21 mole % to about 32 mole %. In one embodiment, the application provides an oxidant stream having an oxygen content of from about 21 mole % to about 30 mole %. In one embodiment, the application provides an oxidant stream having an oxygen content of from about 25 mole % to about 32 mole %. In one embodiment, the application provides an oxidant stream having an oxygen content of from about 25 mole % to about 30 mole %.

In one embodiment, the application provides a burner system adapted to capture $CO_2$ gas from flue gas produced by the burner system. In one embodiment, the application provides a burner system adapted to capture carbon dioxide from flue gas produced by the burner system.

In one embodiment, the burner system comprises a burner in fluid communication with a fuel inlet, an oxidant inlet, and a convection area. The convection area is in fluid communication with a stack comprising a stack damper. In one embodiment, the stack damper is adapted to modulate the flow of flue gas to the stack. In one embodiment, the stack is in fluid communication with a system to store $CO_2$ gas in the flue gas.

In one embodiment, the stack is in fluid communication with a recycle conduit. In one embodiment, the recycle conduit comprises a recycle damper. In one embodiment, the recycle damper is adapted to modulate the flow of flue gas into the recycle conduit.

In one embodiment, the recycle conduit is in fluid communication with a blower. In one embodiment, the blower provides motive force for the recycle stream. In one embodiment, the blower compresses the recycle stream. In one embodiment, the blower is in fluid communication with a condenser and a carbon dioxide removal conduit. In one embodiment, the condenser condenses water from the recycle stream. In one embodiment, condensed water and at least a portion of the carbon dioxide in the stream are removed from the recycle stream, producing a final recycle stream.

In one embodiment, the blower also is in fluid communication with an oxygen mixing conduit. In one embodiment, the oxygen mixing conduit is in fluid communication with the burner. In one embodiment, the oxygen mixing conduit also is in fluid communication with an oxygen inlet.

In one embodiment, an oxygen stream is injected into the recycle stream via the oxygen inlet. In one embodiment, a high velocity oxygen stream is injected through the oxygen inlet. In one embodiment, a pressurized oxidized stream is injected through the oxygen inlet. In one embodiment, the velocity and/or pressure of the oxygen stream is sufficient to entrain at least a portion of the recycle stream in the oxygen stream to produce the oxidant stream. In one embodiment, the velocity and/or pressure at which the oxygen stream is injected is sufficient to provide motive force for the burner system. In one embodiment, the velocity and/or pressure at which the oxygen stream is injected is sufficient to provide the entire motive force for the burner system. In one embodiment, the velocity and/or pressure at which the oxygen stream is injected eliminates the need for a blower.

In one embodiment, in order to assist in startup of the burner system, a high velocity start-up stream is initially injected into the oxygen mixing conduit. In one embodiment, the high velocity start-up stream comprises oxygen and nitrogen. In one embodiment, the high velocity start-up stream comprises oxygen and air.

The methods and compositions of the present application may provide a variety of advantages. Advantages may include, for example: better control over the temperature of a flame in a burner or furnace; additional process temperature control; increased radiative heat transfer; ultra low nitrous oxide emissions; and/or, relatively low carbon dioxide capture costs due to higher concentration of carbon dioxide in the flue gas stream.

The methods and fuel compositions generally may be used with any air-fuel fired heaters. In one embodiment, the air-fuel heater or furnace is modified to add piping or ducting to recycle carbon dioxide and to add oxygen, as described herein. In one embodiment, the air-fuel heater or furnace comprises a recycle conduit. In one embodiment, the air-fuel heater or furnace comprises a recycle conduit comprising a condenser in fluid communication with a carbon dioxide removal conduit. In one embodiment, the air-fuel heater comprises a carbon dioxide removal conduit in fluid communication with a final recycle conduit. In one embodiment, the air-fuel heater or furnace comprises an oxygen mixing conduit in fluid communication with the final recycle conduit. In one embodiment, the air-fuel heater or furnace comprises an oxygen inlet in fluid communication with the oxygen mixing conduit. In one embodiment, the air-fuel heater or furnace comprises a Venturi mixer as the oxygen mixing conduit. In one embodiment, the air-fuel heater or furnace comprises a converging-diverging Venturi mixer as the oxygen mixing conduit.

Suitable heaters which may be used to practice the method, or which may be modified to add piping or ducting to practice the method, include, for example, cylindrical heaters, cabin type heaters, box type heaters, side fired heaters, top fired heaters, bottom fired heaters, natural draft heaters, forced draft heaters, balanced draft heaters, oil fired heaters, gas fired heaters, ambient air heaters, and preheated air heaters.

Examples of suitable furnaces which may be modified to add piping or ducting to practice the method include refinery furnaces. Suitable refinery furnaces include, for example, air-staged burners, pre-mix burners, steam methane reformers, steam boilers, utility boilers, coker furnaces, crude furnaces, vacuum distiller furnaces, all types of feed charge and reboiler furnaces, hydro-cracker furnaces, hydrotreater furnaces, platformer furnaces, ethylene cracker furnaces, thermal cracker furnaces. Examples of suitable burners which may be used to practice the method include raw gas burners and fuel staged burners.

In one embodiment, the method is performed using one or more of air-fuel forced draft heating systems, air-fuel induced draft heating systems, and/or a air-fuel balanced draft heating systems. Balanced draft heating systems usually comprise one or more combustion air preheaters.

In one embodiment, where an air-fuel burner or furnace is used to practice the method, the oxidant has an oxygen content of from about 21 mole % to about 32 mole %. In one embodiment, where an air-fuel burner or furnace is used to practice the method, the oxidant has an oxygen content of from about 21 mole % to about 30 mole %. In one embodiment, where an air-fuel burner or furnace is used to practice the method, the oxidant has an oxygen content of from about 25 mole % to about 32 mole %. In one embodiment, where an air-fuel burner or furnace is used to practice the method, the oxidant has an oxygen content of from about 25 mole % to about 30 mole %.

In one embodiment, the application provides a method for controlling the temperature of the flame produced by a furnace or burner. In one embodiment, varying the oxygen content of the oxidant stream increases burner turn-down. In one embodiment, the temperature of the flame is controlled while reducing greenhouse gas emissions.

Burner turn down is expressed in terms of a ratio of high firing rate to low firing rate. In one embodiment, the method increases the burner turn-down ratio from about 5:1 (for current air-fuel burners) to about 10:1. In one embodiment, burner turn-down ratio is increased by a factor of about 1.5 or more. In one embodiment, burner turn-down ratio is increased by a factor of about 1.8 or more. In one embodiment, burner turn-down ratio is increased by a factor of about 2 or more.

The combustion mixture may comprise a variety of higher heating value (HHV) fuel compositions. In one embodiment, the fuel composition has a HHV of 100 Btu/scf or more. In one embodiment, the fuel composition has a HHV of 300 British thermal units/standard cubic foot (Btu/scf) or more. In one embodiment, the fuel composition has a HHV of 500 Btu/scf or more. In one embodiment, the fuel composition has a HHV of 800 Btu/scf or more. In one embodiment, the fuel composition has a HHV of 1000 Btu/scf or more. In one embodiment, the fuel composition has a HHV of 1200 Btu/scf or more. In one embodiment, the fuel composition has a HHV of 1400 Btu/scf or less.

In one embodiment, the fuel composition comprises gaseous phase hydrocarbons. In one embodiment, the fuel composition is natural gas. Natural gas generally comprises one or more gaseous hydrocarbons having 1 or more carbon atom. In one embodiment, the gaseous hydrocarbons comprises from 1 to 4 carbon atoms. In one embodiment, the gaseous hydrocarbons comprise ethane. In one embodiment, the gaseous hydrocarbons comprise methane.

In one embodiment the fuel composition comprises liquid phase organic materials. Suitable liquid phase organic materials include, for example, fuel oils, pitches, and/or other organic liquid compounds, and combinations thereof. In one embodiment the fuel composition comprises liquid phase hydrocarbons. Suitable liquid phase hydrocarbons comprise hydrogen and carbon. Examples of suitable liquid phase hydrocarbons include, for example, olefins, paraffins, cyclic olefins, cyclic paraffins, aromatics, and combinations thereof.

In one embodiment, the fuel composition comprises solid phase organic materials. In one embodiment the fuel composition comprises one or more solid phase hydrocarbons. Suitable solid phase organic materials include, for example, coal, various types of coke, bio-mass, automobile tires, or any hydrocarbon waste from refinery process streams. Suitable biomass includes, for example, municipal trash, paper mill waste, wood chips, and other trash or waste materials.

The flue gas produced by the method may comprise about 5 vol. % or less nitrogen. In one embodiment, the flue gas may comprise 2 vol. % or more nitrogen. The nitrogen typically results from leaking or tramp air leaks into the furnace from insulation cracks or openings in the furnace walls, ducts, equipment connections, etc., and/or nitrogen present in the fuel. In any event, the nitrogen content is low, and $CO_2$ gas, may be readily separated from the flue gas using known techniques.

Figure 2:
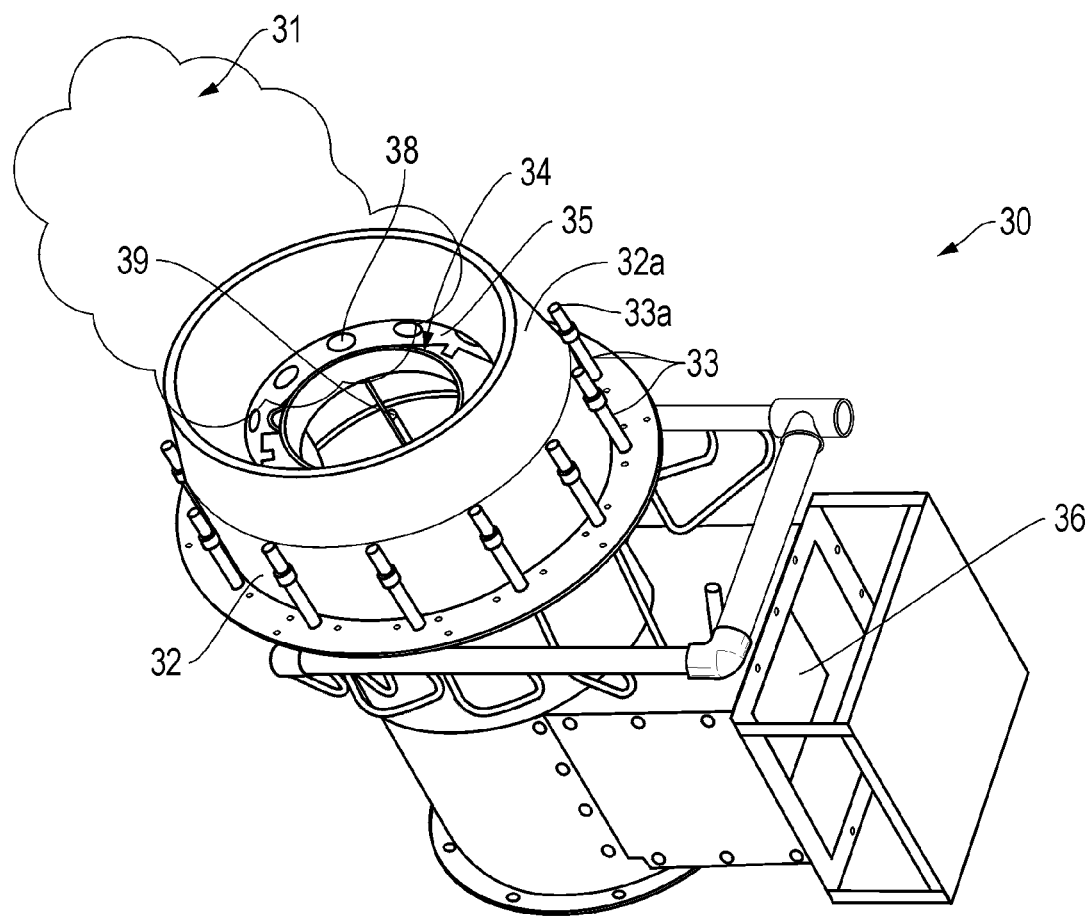
FIG. 2 is a schematic diagram of a typical fuel staged burner.

FIGS. 1 and 2 illustrate the operation of the method using different types of burners.

Burners suitable for modification to operate according to the present method include, for example raw gas burners. Raw gas burners are diffusion flame burners having distinct orifices for fuel and air or oxidant. FIG. 1 illustrates one embodiment of a typical raw gas burner 10.

Referring to FIG. 1, the burner comprises a tile 18 which forms a convection area 12. In one embodiment, the tile 18 is a diverging burner tile. Oxidant is supplied to the convection area 12 via a burner plate 13. In one embodiment, oxidant is supplied to the convection area 12 via apertures 15. In one embodiment, oxidant is supplied to the convection area 12 via oxidant tips 16a. In one embodiment, oxidant is supplied to the convection area 12 via a combination of apertures 15 and oxidant tips 16a.

Fuel is supplied to the convection area 12 via a centrally located primary fuel tip 14. In one embodiment, fuel is supplied to the convection area 12 via the primary fuel tip 14 and one or more secondary fuel tips 16. In one embodiment, the burner comprises a plurality of secondary fuel tips 16 located concentrically outside of the primary fuel tip 14. In one embodiment, the burner comprises about four or more secondary fuel tips located concentrically outside of the primary fuel tip 14. In one embodiment, fuel is supplied directly to the convection area 12 via the primary fuel tip 14 and a plurality of secondary fuel tips 16. In one embodiment, the primary fuel tip 14 and any secondary fuel tips 16 inject the fuel into the convection area 12 via a swirl plate 17. The swirl plate 17 may have a variety of configurations known to persons of ordinary skill in the art.

In one embodiment, the fuel and oxidant are mixed together in the convection area 12. In one embodiment, the resulting air:fuel mixture is ignited by an ignition device (not shown). Where the fuel is injected using a swirl plate 17, recirculation loops created by swirling flame stabilize the flame close to the convection area 12, anchoring the flame to the burner.

The recycle stream is effective for use as oxidant in a raw gas burner. In one embodiment, a raw gas burner burning a recycle stream as oxidant produces a flame with characteristics similar to those produced using air as oxidant. In one embodiment, a flame produced using a recycle stream as oxidant in a raw gas burner has a similar flame temperature compared to a flame produced burning air as oxidant. In one embodiment, a flame produced using recycle stream as oxidant in a raw gas burner has similar overall dimensions compared to a flame produced burning air as oxidant. In one embodiment, a flame produced using a recycle stream as oxidant in a raw gas burner produces a similar flow field compared to a flame produced burning air as oxidant. In one embodiment, a fuel stream produced using recycle stream as oxidant in a raw gas burner has a similar tip velocity to that produced using air as oxidant. In one embodiment, an oxidant stream produced using a recycle stream as oxidant in a raw gas burner has a tip velocity which is similar to that produced using air as oxidant. In one embodiment, mixing using a recycle stream as oxidant in a raw gas burner remains substantially the same as mixing using air is the oxidant. In one embodiment, diffusion or flame development using a recycle stream as oxidant in a raw gas burner remains substantially the same as when air is used as the oxidant.

Another example of burners suitable for modification to operate according to the present method is fuel staged burners. Fuel staged burners are raw fuel burners in which the fuel injection is staged for low-$NO_x$ performance.

An exemplary fuel staged burner is illustrated schematically in FIG. 2. Referring to FIG. 2, the fuel staged burner 30 comprises a tile 32 which angles inward to form a convection cone 32. The convection area within the convection cone 32 is a primary convection area 34. A secondary convection area 31 is located adjacent to and substantially outside of the primary convection area 34.

In the embodiment of FIG. 2, a minor amount of primary fuel is supplied to a primary convection area 34 within the cone 32a via a plurality of primary fuel tips 39. In one embodiment, the burner comprises four or more primary fuel tips 39. In one embodiment, the primary fuel tips 39 inject the fuel into the primary convection area 34 via a flange 35 comprising fuel apertures 38. In one embodiment, the primary fuel tips 39 are angled to inject the primary fuel toward the tile 32. In one embodiment, the angle of the primary fuel tips 39 is such that primary fuel exiting the primary fuel tips 39 tangentially impact the tile 32. In one embodiment, the primary fuel tips 39 and the primary convection area 34 stabilize the burner flame, anchoring the flame to the burner.

In one embodiment, a majority of the fuel combusted by the fuel staged burner 30 is secondary fuel which is injected into the secondary convection area 31 above the first convection area 34. In one embodiment, the secondary fuel is injected into the secondary convection area 31 via secondary fuel tips 33. In one embodiment, the tips 33a of the secondary fuel tips 33 are not angled. In one embodiment, the tips 33a of the secondary fuel tips 33 are angled to inject fuel toward the secondary convection area 31.

A primary oxidant stream, comprising air or oxidant, is supplied from an oxidant inlet 36 to the primary convection area 34. The primary oxidant stream is rich in oxidant. In the primary convection area 34, a primary oxidant:primary fuel mixture is combusted to form a very hot primary flame. A secondary air stream which is relatively poor in oxidant also is produced. The secondary oxidant stream flows to the secondary convection area 31. A mixture of the secondary convection area, the secondary fuel injected by the secondary fuel tips 33 and the secondary oxidant stream is combusted to produce a secondary flame in the secondary convection area 31.

The use of the oxygen poor secondary oxidant stream and the "delayed combustion" of secondary fuel in the secondary convection area 31 produces a relatively cool secondary flame. The relatively cool secondary flame results in reduced thermal $NO_x$ production.

Fuel staged burners 20 are very suitable for recycling flue gas to the burner 20. In one embodiment, the recycle stream would be fed to the fuel staged burner 20 via the oxidant inlet 36. In one embodiment, the recycle stream fed to the fuel staged burner has an adjustable oxygen concentration. In one embodiment, the adjustable oxygen concentration provides for even more flame stability in the fuel staged burner. In one embodiment, the recycle stream comprises an adjustable concentration of heat absorbing carbon dioxide. In one embodiment, using a recycle stream as oxidant in a fuel staged burner produces flame temperature uniformity. In one embodiment, using a recycle stream as oxidant in a fuel staged burner extends the life of the burner. In one embodiment, the burner is a duct burner used in heat recovery and steam generation equipment.

In one embodiment, a fuel staged burner burning a recycle stream as oxidant produces a flame with characteristics similar to those produced using air as oxidant, in terms of flame temperature, overall dimensions, flow-field, etc. In one embodiment, the fuel staged burner burning a recycle stream as oxidant produces a fuel stream having a similar tip velocity as that produced using air as oxidant. In one embodiment, the fuel staged burner produces an oxidant stream having a tip velocity which is similar to that produced using air as oxidant. In one embodiment, using a recycle stream as oxidant in a fuel staged burner, mixing remains substantially the same as when air is the oxidant. In one embodiment, the diffusion or flame development using oxidant comprising a recycle stream in a fuel staged burner remains substantially the same as when air is used as the oxidant.

Figure 3:
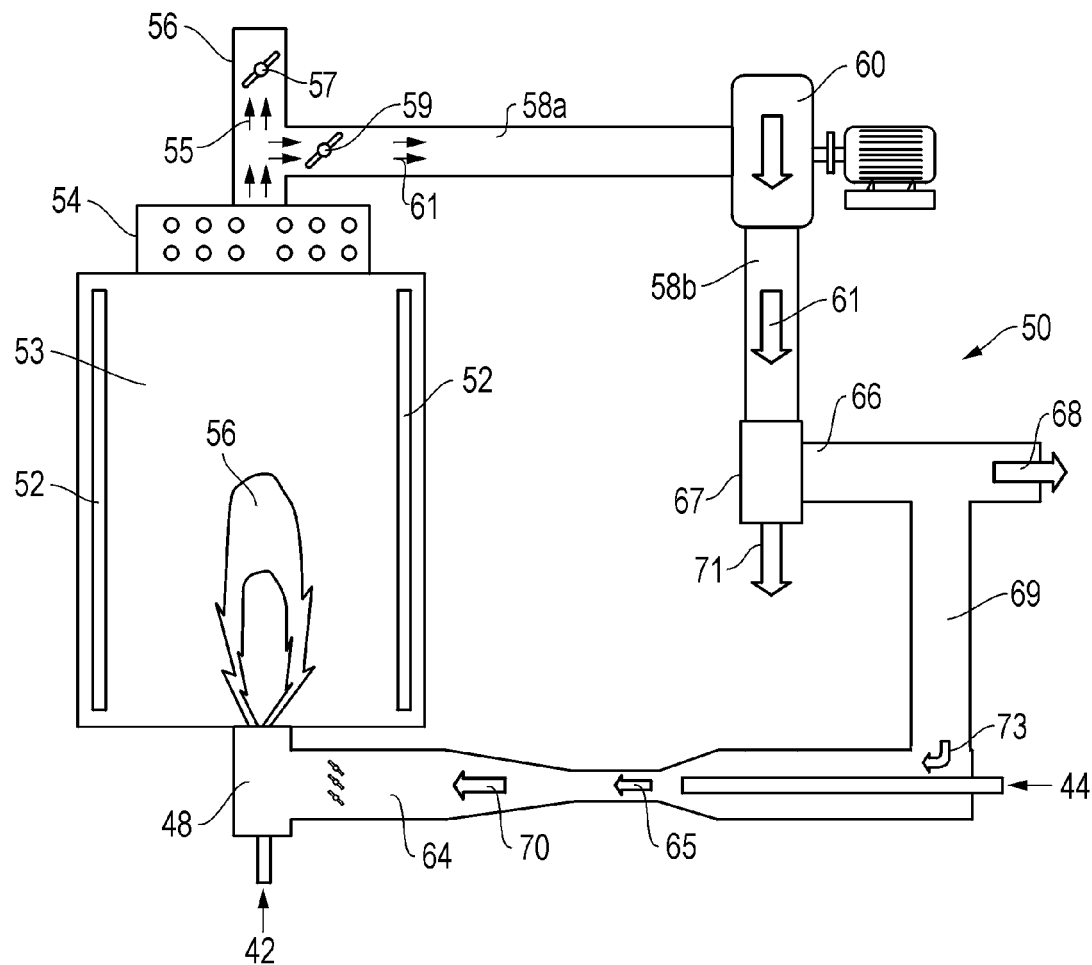
FIG. 3 is a schematic illustration of a process for capture and recycle of $CO_2$ gas using a typical refinery process heater.

FIG. 3 is a schematic diagram illustrating recycle combustion using a typical refinery process heater 50. Referring to FIG. 3, a fuel composition enters the burner 48 at the fuel inlet 42. Oxygen 44 is fed via an oxygen mixing station 64 to the burner 48. The fuel/oxidant mixture is ignited to produce a flame 50 in the process heater 53. The flame and flue gases produced by the flame discharge heat duty to the process tubes 52. Thereafter, the flue gases enter a convection section 54. Additional heat is recovered in the convection section 54 using convection tubes.

The flue gas thereafter is sent to the stack 56. In one embodiment, the stack comprises a stack damper 57. The stack damper 57 is a control valve which controls the fraction of flue gas cycled to the $CO_2$ gas capture stream 55.

In one embodiment, the $CO_2$ gas capture stream 55 flows to a $CO_2$ storage system. Persons of ordinary skill in the art will be familiar with suitable $CO_2$ storage systems. Examples of suitable $CO_2$ storage systems include those described in U.S. Pat. No. 7,282,189, U.S. Pat. No. 7,172,030, and U.S. Pat. No. 7,073,348, each of which is incorporated herein by reference.

Referring again to FIG. 3, the recycle damper 59 controls the fraction of the flue gas directed to a recycle conduit 58a. The fraction of flue gas directed to the recycle conduit 58a is the recycle stream 61. Modulation of the recycle damper 59 and the stack damper 57 determines the relative quantity of flue gas recycled as the recycle stream 61. The recycle stream 61 generally is rich in $CO_2$ gas.

In one embodiment, the combustion does not produce excess water. In one embodiment, the combustion does produce excess water.

The recycle stream 61 generally is maintained at a temperature slightly above the water dew point temperature (300 to 350° F.). In one embodiment, where the combustion does produce excess water, for example when burning methane, at least some of the water vapor is left in the recycle stream 61. In one embodiment, the water vapor maintains the temperature of the recycle stream 61 above the water dew point temperature. In one embodiment, the water vapor retained in the recycle stream 61 improves the thermal efficiency of the furnace.

In one embodiment, where the combustion produces water, at least some of the water vapor is removed from the recycle stream 61. In one embodiment, the recycle conduit 58a, 58b is in fluid communication with a condenser 67. Substantially any condenser may be used. Suitable condensers include, for example, heat exchangers, pin fin exchangers, or any other suitable condensers. As used herein, the word "condenser" encompasses a condenser, a dessicant bed, and any other apparatus for removing excess water from the recycle stream 61.

In one embodiment, the recycle stream 61 is sent to the suction side of a blower 60 and compressed or pressurized. In one embodiment, the blower 60 is upstream of the condenser 67. In one embodiment, the blower 60 is downstream of the condenser 67.

In one embodiment, the recycle stream 61 is compressed at a pressure sufficient to overcome losses in downstream ductwork leading to the burner and the burner nozzle pressure drop, if any. Where the burner is a forced draft burner, a suitable pressure is from about 6.9 kPa (1 psig) to about 13.8 kPa (2 psig). Where the burner is a natural draft burner, a suitable pressure is about 10" WC (inches of water) or less.

In one embodiment, the condenser 67 cools the recycle stream 61, causing water 71 to condense out of the recycle stream 61. The condensed water 71 is collected using known structures and methods.

In one embodiment, water is removed from the recycle stream 61 using a dessicant bed effective to maintain of the recycle stream at substantially the same pressure before and after water is absorbed by the bed material. In one embodiment, a water loaded dessicant bed is regenerated using waste heat.

In one embodiment, the condenser 67 is in fluid communication with a carbon dioxide removal conduit 66. In one embodiment, carbon dioxide is removed from the recycle stream 61 via the carbon dioxide removal conduit 66. In one embodiment, removal of any excess water and/or carbon dioxide from the recycle stream 61 produces a final recycle stream 73. In one embodiment, a final recycle conduit 69 is in fluid communication with the carbon dioxide removal conduit 66 and with the oxygen mixing conduit 64. In one embodiment, the final recycle stream 73 is fed to the oxygen mixing conduit 64 via the final recycle conduit 69.

In one embodiment, the oxygen mixing conduit 64 comprises an oxygen inlet 44. In one embodiment, an oxygen stream 65 is injected through the oxygen inlet 44 into the oxygen mixing conduit where the oxygen stream and the recycle stream 61 are mixed to produce an oxidant stream 70. In one embodiment, in order to improve safety, the oxygen stream 65 is injected into the center of the oxygen mixing conduit 64 without making contact with the walls of the oxygen mixing conduit 64. In this embodiment, safety concerns with non-compatible construction materials are reduced.

In one embodiment, the oxygen mixing conduit 64 comprises oxygen mixing dampers 41. In one embodiment, the oxygen mixing dampers 41 modulate the flow of the oxidant stream 70 from the oxygen mixing conduit 64 to the burner 49.

In one embodiment, the oxidant stream 70 is fed to the burner 48 with the fuel composition. In one embodiment, the amount of oxygen in the oxygen stream 65 is about 10 to 15% in excess of the amount of oxygen required for stoichiometric combustion of the fuel composition.

In one embodiment, the oxygen stream 65 comprises a sufficient amount of oxygen to produce an oxidant stream having an oxygen content of about 10 mole % or more. In one embodiment, the oxygen stream 65 comprises a sufficient amount of oxygen to produce an oxidant stream having an oxygen content of about 14 mole % or more. In one embodiment, the oxygen stream 65 comprises a sufficient amount of oxygen to produce an oxidant stream having an oxygen content of about 18 mole % or more. In one embodiment, the oxygen stream 65 comprises a sufficient amount of oxygen to produce an oxidant stream having an oxygen content of about 21 mole % or more. In one embodiment, the oxygen stream 65 comprises a sufficient amount of oxygen to produce an oxidant stream having an oxygen content of about 25 mole % or more.

In one embodiment, the oxygen stream 65 comprises a sufficient amount of oxygen to produce an oxidant stream having an oxygen content of about 32 mole % or less. In one embodiment, the oxygen stream 65 comprises a sufficient amount of oxygen to produce an oxidant stream having an oxygen content of about 30 mole % or less.

In one embodiment, the oxidant stream 70 is fed to an air-fuel burner. In one embodiment, the air-fuel burner is modified to include piping or ducting to recycle carbon dioxide and to add oxygen to produce an oxidant stream. In one embodiment, the oxidant stream fed to the air-fuel burner has an oxygen content of about 32 mole % or less. In one embodiment, the oxidant stream fed to the air-fuel burner has an oxygen content of about 30 mole % or less. In one embodiment, the oxidant stream fed to the air-fuel burner has an oxygen content of about 21 mole % or more. In one embodiment, the oxidant stream fed to the air-fuel burner has an oxidant content of about 25 mole % or more.

In one embodiment, the oxygen stream 65 comprises 30 mole % oxygen or less. In one embodiment, the oxygen stream 65 comprises 20 mole % oxygen or less. In one embodiment, the oxygen stream 65 comprises 10 mole % oxygen or less.

In one embodiment, the oxygen stream 65 is injected into the recycle stream 61 under pressure. In one embodiment, the oxygen stream 65 is injected into the recycle stream 61 under sufficient pressure to entrain at least a portion of the recycle stream 61 in the oxygen stream 65. In one embodiment, the oxygen stream 65 is injected into the recycle stream 61 under sufficient pressure to provide at least a portion of the motive force required to operate the burner system 40. In one embodiment, the oxygen stream 65 is injected into the recycle stream 61 under sufficient pressure to maintain the desired flame temperature and heat flux profile for the burner system 40.

In one embodiment, the oxidant stream is injected into the oxygen inlet 44 at a pressure of about 1034 kPa (150 psi) or less. In one embodiment, the oxidant stream is injected into the oxygen inlet 44 at a pressure of about 689 kPa (100 psi) or less. In one embodiment, the oxidant stream is injected into the oxygen inlet 44 at a pressure of about 344 kPa (50 psi) or more. In one embodiment, the oxidant stream is injected into the oxygen inlet 44 at a pressure of about 172 kPa (25 psi) or more.

In one embodiment, a high velocity oxygen stream 65 is injected through the oxygen inlet 44. In one embodiment, depending on pressure availability of the oxygen stream, the oxygen injection velocity is 100 ft/s or more. In one embodiment, the oxygen injection velocity is 500 ft/s or more. In one embodiment, the oxygen injection velocity is 1000 ft/sec or less. In one embodiment, the oxygen injection velocity is 1400 ft/sec or less.

In one embodiment, the velocity and/or pressure of the oxygen stream 65 is sufficient to entrain at least a portion of the recycle stream 61 in the oxygen stream 65 to produce the oxidant stream 70. In one embodiment, the velocity and/or pressure at which the oxygen stream 65 is injected is sufficient to provide motive force for the burner system 4*o*. In one embodiment, the velocity and/or pressure at which the oxygen stream 65 is injected is sufficient to provide the entire motive force to operate the burner system 40. In one embodiment, the velocity and/or pressure at which the oxygen stream 65 is injected eliminates the need for a blower 60.

In one embodiment, the oxidant stream 65 is injected into the recycle stream 61 using one or more ejectors. In one embodiment, the oxidant stream 65 is injected using one or more in-line ejectors. In one embodiment, the oxidant stream 65 is injected using a plurality of in-line ejectors. In one embodiment, the one or more ejectors inject the oxygen stream 65 without a pressure drop. In one embodiment, the one or more ejectors boost pressure energy of the oxidant stream 65 in an amount sufficient to overcome a pressure drop in the burner system 40.

In one embodiment, a high velocity oxygen stream 65 is injected into the center of the recycle stream 61. In this embodiment, the pressurized oxygen stream 65 acts as an eductor to provide additional pressure energy to the recycle stream. In one embodiment, one or more oxygen driven eductors provide the entire motive force for the burner system 40. In one embodiment, multiple oxygen driven eductors, in series, provide the entire motive force for the burner system 40.

In one embodiment, commercially available high entrainment efficiency ejectors/eductors are used to inject the oxygen stream 65. Suitable high entrainment efficiency ejectors/eductors are commercially available from a number of companies including, for example, Penberthy, Prophetstown, Ill., and Graham Corporation, Batavia, N.Y.

In one embodiment, the burner system provides static pressure downstream of one or more ejectors. In one embodiment, from about 3.5 kPa (0.5 psig) to about 13.8 kPa (2 psig) static pressure is provided downstream of one or more ejectors. In one embodiment, the static pressure is about 2 inches of water or more. In one embodiment, the static pressure is about 13.8 kPa (2 psig) or less.

In one embodiment, the oxidant stream 70 is recycled to the burner 48. In one embodiment, the oxygen stream 65 is introduced into the oxygen mixing conduit 64 at a distance away from the burner 48 in order to reduce safety concerns.

Figure 4:
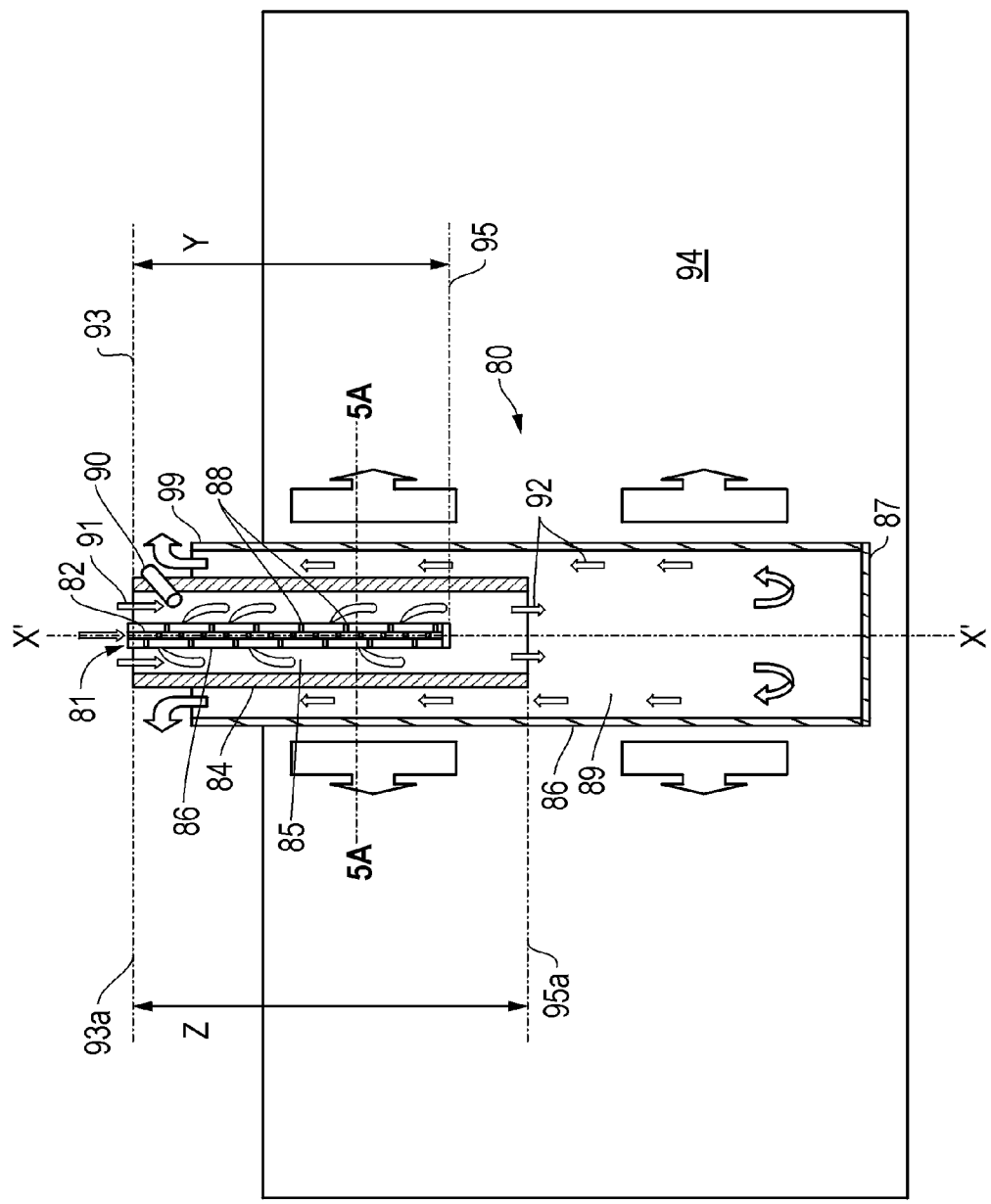
FIG. 4 is a schematic illustration of a tubular burner useful to heat a subterranean hydrocarbon formation which is adapted to capture and recycle $CO_2$ gas.
Figure 5:
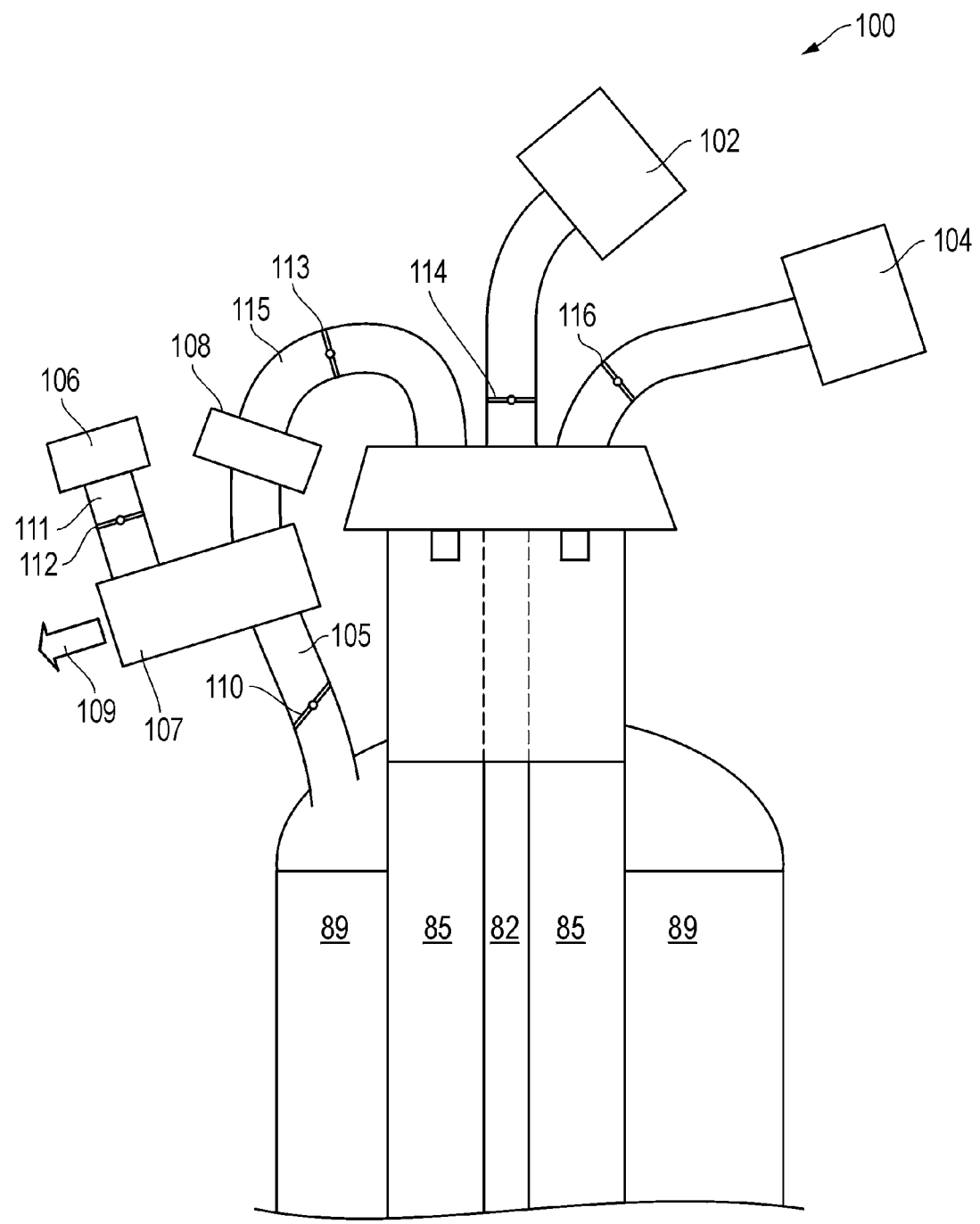
FIG. 5 is a schematic diagram of a manifold for use with the tubular burner system of FIG. 4.

FIG. 4 illustrates a burner system adapted to heat a hydrocarbon formation in situ during hydrocarbon recovery operations, and to capture and recycle carbon dioxide gas. In one embodiment, referring to FIG. 5, the burner system 80 is a substantially concentric tubular system comprising an external wall having a longitudinal axis X-X' extending from a manifold end 99 to a sealed end 87.

In one embodiment, the burner system 80 further comprises a wall 81 extending along the longitudinal axis X-X' from a first manifold end 97 to a first convection end 95. The wall 81 defines a fuel conduit 82. In one embodiment, the wall 81 comprises a plurality of perforations 88 spaced along the longitudinal axis X-X'.

In one embodiment, the fuel conduit 82 may have a variety of geometric configurations. Suitable geometric configurations include cylindrical, triangular, rectangular, pentagonal, hexagonal, heptagonal, octagonal, elliptical, and the like.

Figure 4A:
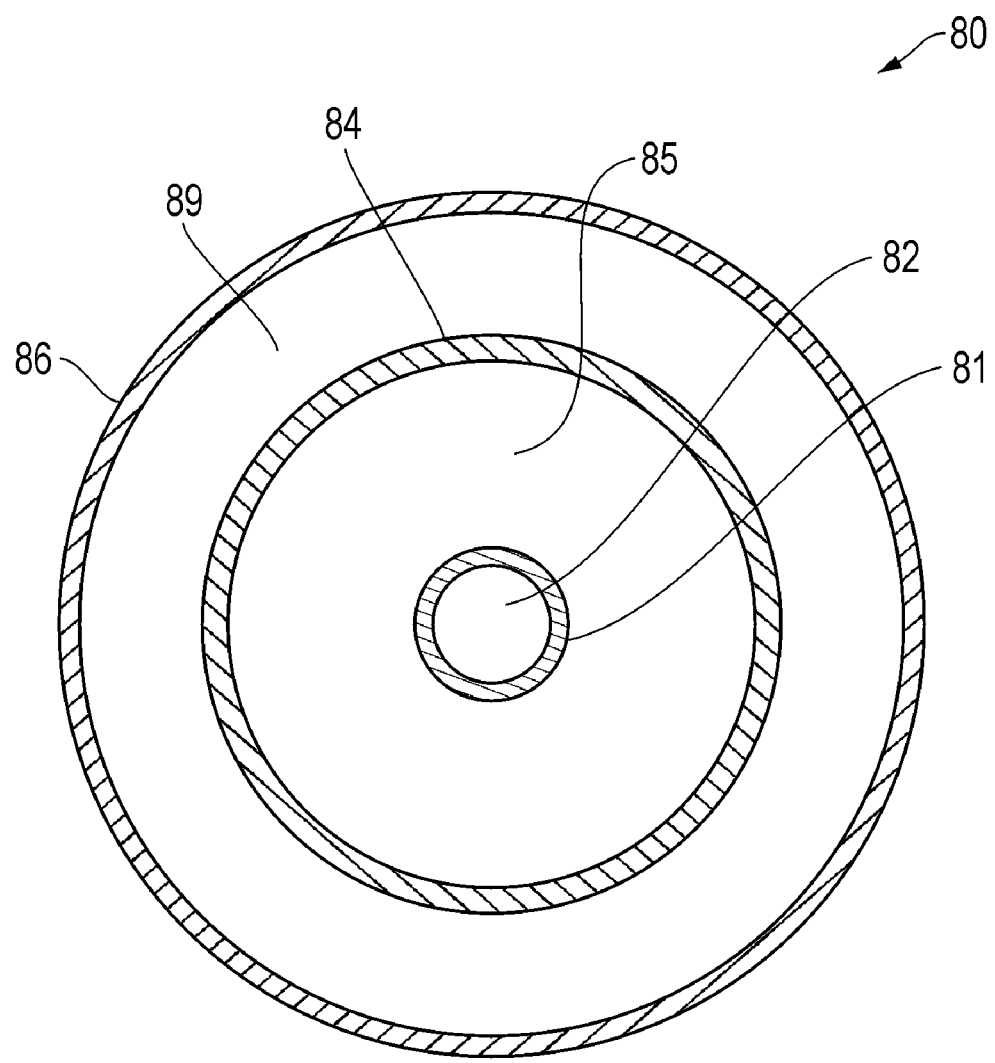
FIG. 4A is a cross sectional view taken along line A-A' of FIG. 4.

In the embodiment of FIG. 4, the fuel conduit 82 is cylindrical. FIG. 4A is a cross sectional view of the burner taken along line A-A' of FIG. 4. As seen more clearly from FIG. 4A, the fuel inlet wall 81 of FIG. 4 defines a substantially cylindrical fuel conduit 82.

Concentrically external to the fuel conduit 82 is an oxidant mixing wall 84 defining an oxidant mixing conduit 85. As seen in FIG. 4, the oxidant mixing conduit 85 extends from a second manifold end 93a to a second convection end 95a. The oxidant mixing conduit 85 also has the longitudinal axis X-X'. In one embodiment, the length Y from the first manifold end 93 of the fuel conduit 82 to the first convection end 95 of the fuel conduit is less than the length Z from the second manifold end 93a of the oxygen mixing conduit to the second convection end 95a of the oxygen mixing conduit 85.

In one embodiment, the oxidant mixing wall 84 may define an oxidant mixing conduit 85 having a variety of geometric configurations, as described above. As seen in FIG. 4A, the oxidant mixing wall 84 in FIG. 4 defines a donut-shaped oxygen mixing conduit 85 comprising the fuel inlet 82 as the "donut hole."

In one embodiment, an ignition device 90 communicates with the oxygen mixing conduit 85. The ignition device 90 may be any suitable ignition device 90.

In one embodiment, an external wall 86 defines a heat conduction conduit 89. In one embodiment, the external wall 86 also has the longitudinal axis X-X'. In one embodiment, the external wall 86 also defines a variety of geometric configurations, as described above. In one embodiment, the external wall 86 defines a donut-shaped heat conduction conduit 89 comprising the oxygen mixing conduit 85 as the "donut hole."

FIG. 4B is a schematic diagram of a manifold 100 adapted to engage the top of the burner system 80 in FIG. 4. In one embodiment, the manifold 100 comprises an oxidant source 104 in fluid communication with the oxygen mixing conduit 85. In one embodiment, the oxidant source 104 is equipped to provide oxidant at a supply pressure of up to 1000 psig (6,894 kPa). In one embodiment, the manifold comprises a fuel source 102 in fluid communication with the fuel conduit 82. In one embodiment, the fuel source 102 is equipped to provide fuel at a supply pressure of up to 1000 psig (6,894 kPa).

In one embodiment, the manifold comprises a flue gas conduit 105 in fluid communication with the heat conduction conduit 89 and with a condenser 107. Excess water 109 from the combustion is removed from the flue gas via the condenser 107, producing a final recycle stream. The condenser 107 may be any condenser or other apparatus, such as a dessicant bed, which is suitable to remove water 109 from the flue gas.

In one embodiment, the condenser 107 is in fluid communication with a final recycle conduit 115. In one embodiment, the condenser 107 is in fluid communication with carbon dioxide removal conduit 111. In one embodiment, the condenser 107 is in fluid communication with both a final recycle conduit 115 and a carbon dioxide removal conduit 111.

In one embodiment, the final recycle conduit 115 is in fluid communication with the oxygen mixing conduit 85. In one embodiment, the final recycle conduit 115 comprises a final recycle valve 113 adapted to control a flow of the final recycle stream from the condenser 107 to the oxygen mixing conduit 85.

In one embodiment, the carbon dioxide removal conduit 111 comprises a carbon dioxide removal valve 112 adapted to control the flow of $CO_2$ to the $CO_2$ storage unit 106.

In one embodiment, the manifold comprises a fuel valve 114 to control a flow of fuel from the fuel source 102 to the fuel conduit 82. In one embodiment, the manifold comprises an oxygen valve 116 to control a flow of oxygen from the oxygen source 104 to the oxygen mixing conduit 85. Suitable manifolds may be obtained from a variety of commercial sources.

In one embodiment, oxidant comprising an oxygen stream from the oxygen source 104 and a warm recycle stream comprising warm $CO_2$ from the recycle conduit 115 is injected under pressure into the oxidant mixing conduit 85. In one embodiment, a sufficient amount of the recycle stream from the recycle conduit 105 is mixed with a sufficient amount of an oxygen stream from the oxygen source 104 to produce an oxidant stream having a desired oxygen content.

In one embodiment, a fuel composition is injected from the fuel source 102 into the fuel conduit 82 under sufficient pressure to penetrate the perforations 88 in fuel inlet conduit 82 (FIG. 4). In one embodiment, fuel penetrating the perforations mixes with the oxidant to form a fuel/oxidant mixture. In one embodiment, the ignition device 90 is activated to ignite the fuel/oxidant mixture, producing hot flue gas 92. The hot flue gas continues a downward trajectory from the end 95a of the oxygen mixing conduit 85 along the longitudinal axis X-X' near the center of the heat conduction conduit 89. At or near the sealed end 87 of the heat conduction conduit 89, the hot flue gas 92 is deflected and travels upward along the external wall 86 of the heat conduction conduit 89. The hot flue gas 92 heats the external wall 86 and heat is conducted to the hydrocarbon formation 94.

In one embodiment, the flue gas 92 exiting at the top 99 of the heat conduction conduit 89 enters the manifold 100. A portion of the flue gas 92 entering the manifold 100 travels to the $CO_2$ storage unit 106. A portion of the flue gas 92 entering the manifold 100 travels to the recycle conduit 105. The flue gas 92 entering the manifold 100 and the recycle conduit is still warm and rich in $CO_2$.

The foregoing burner systems provides improved combustion stability and process heater operation for majority of process heaters. In natural draft process heaters, introduction of oxidant to maintain safe flammability depends upon furnace draft. Furnace draft further depends on stack height and temperature of the flue gas stream. In contrast, safety of the present system relies on ducting of the oxidant stream and improved flow control. As a result, the $CO_2$ recycle system provides improved combustion stability and process heater operation for majority of natural draft process heaters.

The application will be better understood with reference to the following Examples, which are illustrative only and should not be construed as limiting the claims:

EXAMPLE 1

Assessing Peak Heat Flux

The peak heat flux limits the combustion mixture that can be fed to a burner and furnace. A peak adiabatic flame temperature generally occurs at stoichiometric, or at a "fuel equivalence ratio" of $\Phi=1$.

The phrase "fuel equivalence ratio" ($\Phi$) is defined as $(fuel/air)_{actual-in-mixture}/(fuel/air)_{stoichiometric}$. A fuel equivalence ratio of $\Phi=1$ is stoichiometric. If $\Phi<1$, then a combustion is a "lean fuel" combustion. If $\Phi>1$, then a combustion is a "rich fuel" combustion.

Figure 6:
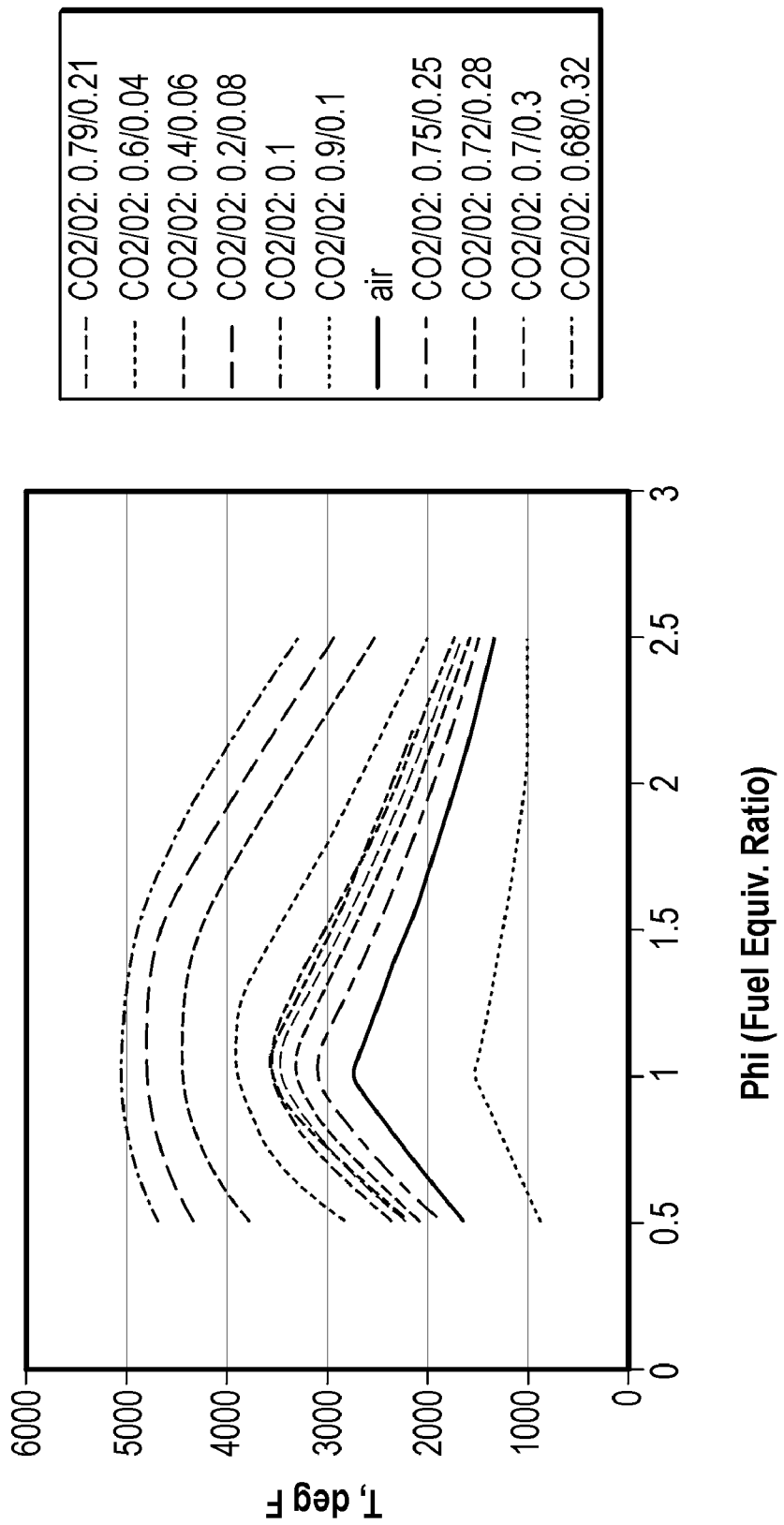
FIG. 6 is a graph of the adiabatic temperature produced when combusting a series of test fuel compositions at various fuel equivalence ratios ($\Phi$).

In FIG. 6, the calculated adiabetic flame temperatures for air-fuel combustion at fuel equivalence ratios of from 0.5 to 2.5 and at various $CO_2:O_2$ ratios are graphed. As seen from FIG. 5, the calculated adiabatic flame temperature of a combustion mixture generally increases when the combustion mixture comprises more oxygen. The calculated adiabatic flame temperature of a combustion mixture generally decreases when the combustion mixture comprised less oxygen.

As seen from FIG. 6, substantially the same calculated adiabatic flame temperatures are produced at $\Phi$ of from 0.5 to 2.5 (a) when the oxidant comprises air, and (b) when the oxidant comprises carbon dioxide comprising about 21 mole % to about 32 mole % oxygen. Substantially the same calculated adiabatic flame temperatures are produced at $\Phi$ of from 0.5 to 2.5 when the oxidant comprises carbon dioxide comprising about 30 mole % or less oxygen.

EXAMPLE 2

Table 1 shows the predicted flue gas composition obtained when fuel gas is burned with oxidant comprising a $CO_2:O_2$ mixture at a 75:25 molar ratio (similar to the ratio of $N_2:O_2$ in air). The assumed combustion mixture and the predicted composition of resulting flue gas are shown in the following Table:

| CH4 + 1.15 * 2($O_2$ + 75/25 $CO_2$) --> $CO_2$ + 6.9$CO_2$ + 2$H_2O$ + 0.30$O_2$ | | | | | |
|---|---|---|---|---|---|
| | Fuel Composition | | | Flue Gas Composition | |
| | moles | lbs | | moles | lbs |
| CH4 | 1 | 16 | $CO_2$ | 1 | 44.00 |
| | | | $H_2O$ | 2 | 36.00 |
| O2 | 2.3 | 73.6 | $O_2$ | 0.3 | 9.60 |
| CO2 | 6.90 | 18.98 | $CO_2$ | 6.9 | 303.60 |
| sum | 10.20 | 108.58 | | 10.20 | 393.20 |

As seen from the Table, the combustion is predicted to produce primarily carbon dioxide, water, and oxygen. The predicted flue gas comprises about 80 mole % carbon dioxide. This is much higher than the carbon dioxide content of flue gases produced by air-fuel combustion, which typically comprise about 10 mole % carbon dioxide.

EXAMPLE 3

An assessment was performed to determine whether a recycled carbon dioxide/oxygen stream can be successfully combusted using existing air-fuel heating equipment. Specifically, it was assumed that natural gas was fed to a combustion chamber through a first nozzle having a first nozzle diameter. It was also assumed that a variety of oxidants were fed to the combustion chamber through a second nozzle having a second nozzle diameter. The assumed test oxidants were carbon dioxide streams having an oxygen content of from 24 mole % to 28 mole %. The pressure drop across the fuel and oxidant nozzles was predicted. The assumed parameters of the combustion and the predicted pressure drops are shown in the following Table:

| Conditions | specific gravity | Flow rate (scfh[1]) | Nozzle diameter (inch) | Stoichiometric $O_2$ (scfh) | Velocity (ft/sec) | Pressure Drop (iwc[2]) |
|---|---|---|---|---|---|---|
| Fuel, natural gas | 0.6 | 1000 | 0.5 | 2,000 | 203.72 | 7.01 |
| Air at standard conditions | 1 | 9,530 | 4 | 2,000 | 30 | 0.26 |
| $CO_2$ recycle, 24% $O_2$, rest $CO_2$ | 1.426 | 8,333 | 4 | 2,000 | 27 | 0.28 |
| $CO_2$ recycle, 25% $O_2$, rest $CO_2$ | 1.422 | 8,000 | 4 | 2,000 | 25 | 0.26 |
| $CO_2$ recycle, 26% $O_2$, rest $CO_2$ | 1.418 | 7,692 | 4 | 2,000 | 24 | 0.24 |
| $CO_2$ recycle, 28% $O_2$, rest $CO_2$ | 1.410 | 7,143 | 4 | 2,000 | 23 | 0.21 |

[1] scfh = standard cubic foot per hour
[2] iwc = inches of water column

All of the oxidant streams produced a predicted pressure drop across existing burner fuel and oxidant nozzles that was similar in magnitude and within burner turndown specifications. An insignificant reduction in flow rate with an increase in carbon dioxide content of the oxidant stream was predicted. All of the oxidant streams produce predicted flame momentums within burner turndown specifications. Predicted oxidant and fuel velocities were similar for all of the oxidant streams. The predicted flame momentums and flame characteristics were similar for all of the oxidant streams. All of the oxidant streams produced predicted flame characteristics similar to those produced burning an air-fuel combustion mixture, in terms of flame temperature, flame length, flame momentum, and heat flux profile.

Based on the foregoing, existing equipment for air-fuel combustion may be used to burn combustion mixtures comprising recycled carbon dioxide streams. In one embodiment, minimal modifications may include adding piping or ducting to remove water, to recycle carbon dioxide, and to add oxygen. In one embodiment, existing equipment may be modified by adding eductors to assist in injecting oxygen. Combustion mixtures comprising the recycled oxidant are predicted to be effective to achieve required heating performance, including required heating duty, heat flux profile, and emission performance, while maintaining the life of the heating components. The method and equipment permit carbon dioxide capture at minimum capture cost and at minimum capital cost.

Persons of ordinary skill in the art will recognize that many modifications may be made to the embodiments described herein. The embodiments described herein are meant to be illustrative only and should not be taken as limiting the invention, which will be defined in the claims.

We claim:

1. A method, comprising:
   burning with a burner of a furnace a combustion mixture comprising a fuel composition and an oxidant stream, which comprises a first oxygen content of about 10 mole % or more and a first carbon dioxide ($CO_2$) gas content of about 68 mole % or more, on a dry basis, the burning of which produces a flue gas comprising $CO_2$ and water;
   recovering a recycle stream from the flue gas;
   removing water from said recycle stream;
   separating at least a portion of the carbon dioxide from said recycle stream for capture or storage;
   providing a final recycle stream upon removing said water and separating said at least a portion of the carbon dioxide from said recycle stream; and
   mixing at least a portion of said final recycle stream with a sufficient amount of an oxygen stream to produce said oxidant stream.

2. The method of claim 1 wherein the first $CO_2$ gas content is about 70 mole % or more on a dry basis.

3. The method of claim 1 wherein the first oxygen content is from 21 mole % to 32 mole %.

4. The method of claim 1 wherein the first oxygen content is from 21 mole % to 30 mole %.

5. The method of claim 1 wherein the first oxygen content is from 25 mole % to 32 mole %.

6. The method of claim 1 wherein the first oxygen content is from 25 mole % to 30 mole %.

7. The method of claim 1 wherein the mixing comprises injecting the oxygen stream into the final recycle stream at a velocity of from 100 ft/s to about 1400 ft/sec.

8. The method of claim 3 wherein the mixing comprises injecting the oxygen stream into the final recycle stream at a velocity of from 100 ft/s to about 1400 ft/sec.

9. The method of claim 8 further comprising providing a static pressure of about 2 inches of water or more downstream of the injecting.

10. The method of claim 1 further comprising: varying the first oxygen content and the first carbon dioxide gas content to control heat flux and heat transfer in the furnace or inside a burner.

11. The method of claim 10 wherein heat flux and heat transfer in the furnace is controlled by controlling one or more of the flame temperature, operating temperature, flame emissivity, and a combination thereof.

12. The method of claim 10 comprising varying the first oxygen content within from about 21 mole % to about 32 mole %.

13. The method of claim 10 comprising varying the first oxygen content within from about 21 mole % to about 30 mole %.

14. The method of claim 10 comprising varying the first oxygen content within from about 25 mole % to about 32 mole %.

15. The method of claim 10 comprising varying the first oxygen content within from about 25 mole % to about 30 mole %.

16. The method of claim 12 wherein the fuel composition is natural gas.

17. The method of claim 1 further comprising storing said at least a portion of the carbon dioxide.

18. The method of claim 1 wherein the method increases the burner turn-down ratio by a factor of about 1.5 or more.

19. The method of claim 1 wherein the method increases the burner turn-down ratio by a factor of about 1.8 or more.

20. The method of claim 15 wherein the method increases the burner turn-down ratio by a factor of about 2 or more.

21. A method according to claim 1, wherein the method comprises:
   controlling the temperature of a flame produced by said burner of said furnace by;
   controlling the flame temperature over flame length by varying said first oxygen content and said first $CO_2$ gas content of said oxidant stream.

22. The method of claim 21 comprising varying the first oxygen content of the oxidant stream within from about 21 mole % to about 32 mole %.

23. The method of claim 21 comprising varying the first oxygen content of the oxidant stream within from about 21 mole % to about 30 mole %.

24. The method of claim 21 comprising varying the first oxygen content of the oxidant stream within from about 25 mole % to about 32 mole %.

25. The method of claim 21 comprising varying the first oxygen content of the oxidant stream ithin from about 25 mole % to about 30 mole %.

26. The method of claim 22 comprising increasing the oxygen content of the first oxidant stream to increase the flame temperature.

27. The method of claim 22 comprising decreasing the oxygen content of the recycle first oxidant stream to decrease the flame temperature.

28. A method according to claim 1, wherein the method comprises:
   controlling the emissivity and heat transfer properties of said furnace by;
   controlling said first oxygen content and said first $CO_2$ gas content of said oxidant stream.

29. The method of claim 28 wherein the fuel composition is natural gas.

* * * * *